(12) United States Patent
Hosoe et al.

(10) Patent No.: US 9,228,660 B2
(45) Date of Patent: Jan. 5, 2016

(54) SLIDING MEMBER

(75) Inventors: Takeshi Hosoe, Minato-Ku (JP); Hideyuki Inoue, Minato-Ku (JP)

(73) Assignee: Eagle Industry Co., Ltd., Minato-Ku (JP)

( * ) Notice: Subject to any disclaimer, the term of this patent is extended or adjusted under 35 U.S.C. 154(b) by 618 days.

(21) Appl. No.: 13/505,566

(22) PCT Filed: Mar. 14, 2011

(86) PCT No.: PCT/JP2011/055966
§ 371 (c)(1),
(2), (4) Date: May 2, 2012

(87) PCT Pub. No.: WO2011/115073
PCT Pub. Date: Sep. 22, 2011

(65) Prior Publication Data
US 2012/0217705 A1    Aug. 30, 2012

(30) Foreign Application Priority Data

Mar. 15, 2010   (JP) .................................. 2010-057579

(51) Int. Cl.
*F16J 15/34*    (2006.01)

(52) U.S. Cl.
CPC ............ *F16J 15/3412* (2013.01); *F16J 15/342* (2013.01); *F16J 15/3424* (2013.01); *F16J 15/3428* (2013.01)

(58) Field of Classification Search
CPC .... F16J 15/3412; F16J 15/3424; F16J 15/342
USPC .................................................. 277/399–401
See application file for complete search history.

(56) References Cited

U.S. PATENT DOCUMENTS

| 3,383,116 | A | * | 5/1968 | Carter | .................... | F16J 5/3412 |
| | | | | | | 277/385 |
| 5,174,584 | A | * | 12/1992 | Lahrman | ....................... | 277/400 |
| 5,447,316 | A | * | 9/1995 | Matsui | .......................... | 277/400 |

(Continued)

FOREIGN PATENT DOCUMENTS

| EP | 0 601 821 A1 | 6/1994 |
| EP | 0 637 706 A1 | 2/1995 |

(Continued)

OTHER PUBLICATIONS

Machine Translation and English language Abstract of JP 2009-014183.*

(Continued)

*Primary Examiner* — Kristina Fulton
*Assistant Examiner* — Nicholas L Foster
(74) *Attorney, Agent, or Firm* — Burr & Brown, PLLC

(57) ABSTRACT

An annular sliding member which is used in a mechanical seal, is attached to a rotating shaft, and slidably comes into contact, by being applied with energizing force in the axial direction, with another annular sliding member attached to a housing, wherein the sliding surface which comes into contact with the other sliding member is formed from: a dynamic pressure generating groove which guides a fluid to be sealed from a region to be sealed to the side of a region to not be sealed of the sliding surface, and a concave-convex section configured from a plurality of minute grooves which have a shallower depth than the dynamic pressure generating groove.

7 Claims, 6 Drawing Sheets

(56) References Cited

U.S. PATENT DOCUMENTS

| | | | |
|---|---|---|---|
| 5,501,470 A * | 3/1996 | Fuse et al. | 277/400 |
| 5,529,318 A * | 6/1996 | Fuse | F16J 5/3412 |
| | | | 277/400 |
| 6,213,473 B1 * | 4/2001 | Lebeck | F16J 15/342 |
| | | | 277/387 |
| 6,454,268 B1 | 9/2002 | Muraki | |
| 8,360,436 B2 * | 1/2013 | Teshima et al. | 277/400 |
| 2011/0101616 A1 | 5/2011 | Teshima et al. | |
| 2014/0159314 A1 * | 6/2014 | Hosoe et al. | 277/358 |
| 2014/0167361 A1 * | 6/2014 | Osada et al. | 277/400 |
| 2014/0167362 A1 * | 6/2014 | Hosoe et al. | 277/400 |
| 2014/0197600 A1 * | 7/2014 | Hosoe et al. | 277/409 |
| 2014/0217676 A1 * | 8/2014 | Hosoe et al. | 277/350 |
| 2014/0294330 A1 * | 10/2014 | Tokunaga | 384/123 |
| 2015/0042045 A1 * | 2/2015 | Inoue | F16J 5/3424 |
| | | | 277/431 |
| 2015/0084286 A1 * | 3/2015 | Inoue | F16J 15/3424 |
| | | | 277/400 |
| 2015/0097341 A1 * | 4/2015 | Inoue | F16J 15/3424 |
| | | | 277/400 |
| 2015/0115540 A1 * | 4/2015 | Tokunaga | F16J 15/3412 |
| | | | 277/400 |
| 2015/0123350 A1 * | 5/2015 | Itadani | F16J 15/3412 |
| | | | 277/400 |
| 2015/0167847 A1 * | 6/2015 | Tokunaga | F16J 15/3412 |
| | | | 277/400 |

FOREIGN PATENT DOCUMENTS

| | | | |
|---|---|---|---|
| EP | 1 231 419 A2 | 8/2002 | |
| JP | 04-337165 A1 | 11/1992 | |
| JP | 08-159295 A1 | 6/1996 | |
| JP | 2002-235858 A1 | 8/2002 | |
| JP | 2006-022834 A1 | 1/2006 | |
| JP | 2009-14183 * | 1/2009 | F16C 33/24 |
| WO | 2009/087995 A1 | 7/2009 | |

OTHER PUBLICATIONS

International Search Report dated Jun. 14, 2011.
Extended European Search Report (Application No. 11756258.7) dated Mar. 3, 2014.

* cited by examiner (A)

SLIDING MEMBER

TECHNICAL FIELD

The present invention relates to a sliding member used for a mechanical seal.

BACKGROUND ART

In a mechanical seal used as a shaft seal device of a pump and the like, a first sliding member fixed to a shaft and a second sliding member fixed to a housing are brought into close contact with each other subject to an energizing force in an axial direction by a spring or the like and also slid each other by the rotation of the shaft. Thus, sliding properties have been enhanced by providing irregularities or grooves on the sliding surface of the sliding member.

For example, Patent Document 1 describes a mechanical seal that seeks to improve lubricity by forming fine irregularities having directional properties on the sliding surface of a sliding member by femtosecond laser beam machining to make it easier for a fluid to be sealed to flow to the sliding surface. Patent Document 2 describes a mechanical seal that seeks to reduce sliding resistance by generating dynamic pressure during shaft rotation by grooves formed on the sliding surface to draw more fluid to be sealed to the sliding surface (formation of a lubricating film by the fluid to be sealed).

Dynamic pressure that mitigates sliding resistance of a sliding member is not generated before the rotational speed of the shaft reaches a certain level of high speed. Thus, a sufficient amount of fluid to be sealed cannot be interposed between sliding surfaces before the rotational speed at which dynamic pressure is generated after the start of rotation, which could lead to lower lubricity. In such a state, the torque becomes high, seizing, vibration, or noise is generated, and sliding properties become unstable.

PRIOR ART DOCUMENT

Patent Document

Patent Document 1: WO2009/087995
Patent Document 2: Japanese Patent Application Laid-Open No. 2006-022834

SUMMARY OF THE INVENTION

Problems to be Solved by the Invention

The present invention has been made to solve the above problem of conventional technology and an object thereof is to provide a sliding member capable of stabilizing sliding properties regardless of the rotational speed of a rotating shaft.

Means for Solving the Problems

In order to achieve the above object, according to the present invention, there is provided a sliding member in an annular shape used for a mechanical seal that suppresses leakage of a fluid to be sealed from between a housing and a rotating shaft penetrating the housing, mounted on one of the housing and the rotating shaft, and freely slidingly coming into contact with another sliding member in the annular shape mounted on the other of the housing and the rotating shaft after receiving an energizing force in an axial direction, wherein on a sliding surface with the other sliding member, a dynamic pressure generating groove that guides the fluid to be sealed from a region to be sealed to a side of a region to not be sealed of the sliding surface and also generates dynamic pressure resisting the energizing force by relative flow of the fluid to be sealed caused by rotation of the rotating shaft, and an concave-convex section that is a groove shallower than the dynamic pressure generating groove and is constituted of a plurality of minute grooves extending in a direction inclined with respect to a sliding direction such that the fluid to be sealed is guided from the side of the region to be sealed to the side of the region to not be sealed of the sliding surface are formed.

According to the present invention, sliding properties at low speed can be improved. That is, the concave-convex section formed of minute grooves shallower than the dynamic pressure generating groove can produce an effect of reducing the coefficient of friction even when the rotational speed of the rotating shaft is low. Thus, lubricity of the sliding surface can be increased by the concave-convex section before the rotational speed of the rotating shaft reaches the speed at which a dynamic pressure effect caused by the dynamic pressure generating groove is obtained. Moreover, if the rotational speed of the rotating shaft increases to generate the dynamic pressure effect caused by the dynamic pressure generating groove, excellent lubricity can be maintained also at high speed.

The dynamic pressure generating groove and the concave-convex section are preferably formed close to each other and the concave-convex section is more preferably formed downstream of the dynamic pressure generating groove in a flow direction of the fluid to be sealed.

With the dynamic pressure generating groove deeper that minute grooves constituting the concave-convex section formed upstream of the concave-convex section in the flow direction of the fluid to be sealed as described above, the amount of the fluid to be sealed guided into the concave-convex section can be increased.

Normally, the fluid to be sealed flows from a region close to the region to be sealed in the concave-convex section, that is, from a region on the circumferential side facing the region to be sealed in the sliding member into the concave-convex section. According to the present invention, in addition to the above region close to the circumferential surface, the inflow of the fluid to be sealed can be sought from a region close to the dynamic pressure generating groove.

Because, as described above, the region of inflow of the fluid to be sealed into the concave-convex section can be enlarged, even if the region close to the circumferential surface is reduced, a desired amount of inflow can be secured. Therefore, the range of formation of the concave-convex section in the circumferential direction can be decreased so that flexibility of design can be increased. Particularly when a plurality of the dynamic pressure generating grooves or a plurality of the concave-convex sections is formed, more dynamic pressure generating grooves or more concave-convex sections can be formed.

The dynamic pressure generating groove and the concave-convex section are preferably formed adjacent to each other.

Accordingly, it becomes easier for the fluid to be sealed to flow into the concave-convex section so that lubricity at low speed can further be improved. That is, the fluid to be sealed is introduced into the concave-convex section from the dynamic pressure generating groove immediately after the start of rotation and therefore, lifting force acting to separate the sliding surface from the other sliding member can be caused at the onset of the start of rotation.

If the rotation direction of the rotating shaft changes and the flow direction of the fluid to be sealed is reversed, the dynamic pressure generating groove and the concave-convex section produce opposite effects. That is, the dynamic pressure generating groove does not generate dynamic pressure and acts to guide the fluid to be sealed from the side of the region to not be sealed of the sliding surface to the region to be sealed. Also with the changed rotation direction of the rotating shaft, the inclination direction of a plurality of minute grooves constituting the concave-convex section acts in a direction that guides the fluid to be sealed from the side of the region to not be sealed to the side of the region to be sealed.

Thus, the following configuration can suitably be adopted.

That is, the sliding member may include a first dynamic pressure generating groove that generates the dynamic pressure for one rotation direction of the rotating shaft, a first concave-convex section that guides the fluid to be sealed from the side of the region to be sealed of the sliding surface to the side of the region to not be sealed thereof for the one rotation direction of the rotating shaft, a second dynamic pressure generating groove that generates the dynamic pressure for the other rotation direction of the rotating shaft, a second concave-convex section that guides the fluid to be sealed from the side of the region to be sealed of the sliding surface to the side of the region to not be sealed thereof for the other rotation direction of the rotating shaft.

According to this configuration, an improvement effect of lubricity can be obtained regardless of the rotation direction of the rotating shaft and also lubricity can be improved while leakage of the fluid to be sealed to the region to not be sealed being suppressed. That is, when the rotating shaft rotates in one rotation direction, the first dynamic pressure generating groove and the first concave-convex section produce an effect of dynamic pressure generation and lubricity improvement and the second dynamic pressure generating groove and the second concave-convex section produce an effect of bringing the fluid to be sealed back to the region to be sealed from the sliding surface. When the rotating shaft rotates in the other rotation direction, the second dynamic pressure generating groove and the second concave-convex section produce an effect of dynamic pressure generation and lubricity improvement and the first dynamic pressure generating groove and the first concave-convex section produce an effect of bringing the fluid to be sealed back to the region to be sealed from the sliding surface. Accordingly, leakage of the fluid to be sealed into the region to not be sealed due to excessive introduction thereof to the sliding surface can be suppressed while active introduction of the fluid to be sealed to the sliding surface being sought regardless of the rotation direction of the rotating shaft.

Further, the first dynamic pressure generating groove, the first concave-convex section, the second concave-convex section, and the second dynamic pressure generating groove may be arranged in this order from upstream to downstream in the flow direction of the fluid to be sealed for one rotation direction of the rotating shaft.

According to the above configuration, a flow of suction into the sliding surface and a flow of discharge from the sliding surface are formed in the fluid to be sealed along the flow direction thereof.

That is, when the rotating shaft rotates in one rotation direction, a flow that produces a suction effect to introduce the fluid to be sealed from the region to be sealed to the sliding surface by the first dynamic pressure generating groove and the first concave-convex section and then produces a discharge effect to discharge the fluid to be sealed from the sliding surface to the region to be sealed by the second concave-convex section and the second dynamic pressure generating groove is formed. When the rotation direction of the rotating shaft changes to the other rotation direction, a flow that produces a suction effect of the fluid to be sealed by the second dynamic pressure generating groove and the second concave-convex section and then produces a discharge effect of the fluid to be sealed by the first concave-convex section and the first dynamic pressure generating groove is formed.

Accordingly, lubricity can be improved while leakage of the fluid to be sealed to the region to not be sealed being suppressed more effectively.

Effects of the Invention

According to the present invention, sliding properties can be stabilized regardless of the rotational speed of the shaft.

DETAILED DESCRIPTION OF THE INVENTION

A mode to embody the present invention will illustratively be described in detail below based on an embodiment with reference to the following drawings. However, if not specifically mentioned, dimensions, materials, shapes, and relative arrangements of structural elements described in the embodiment are not intended to limit the scope of the present invention to such examples only.

Embodiment

Figure 1:
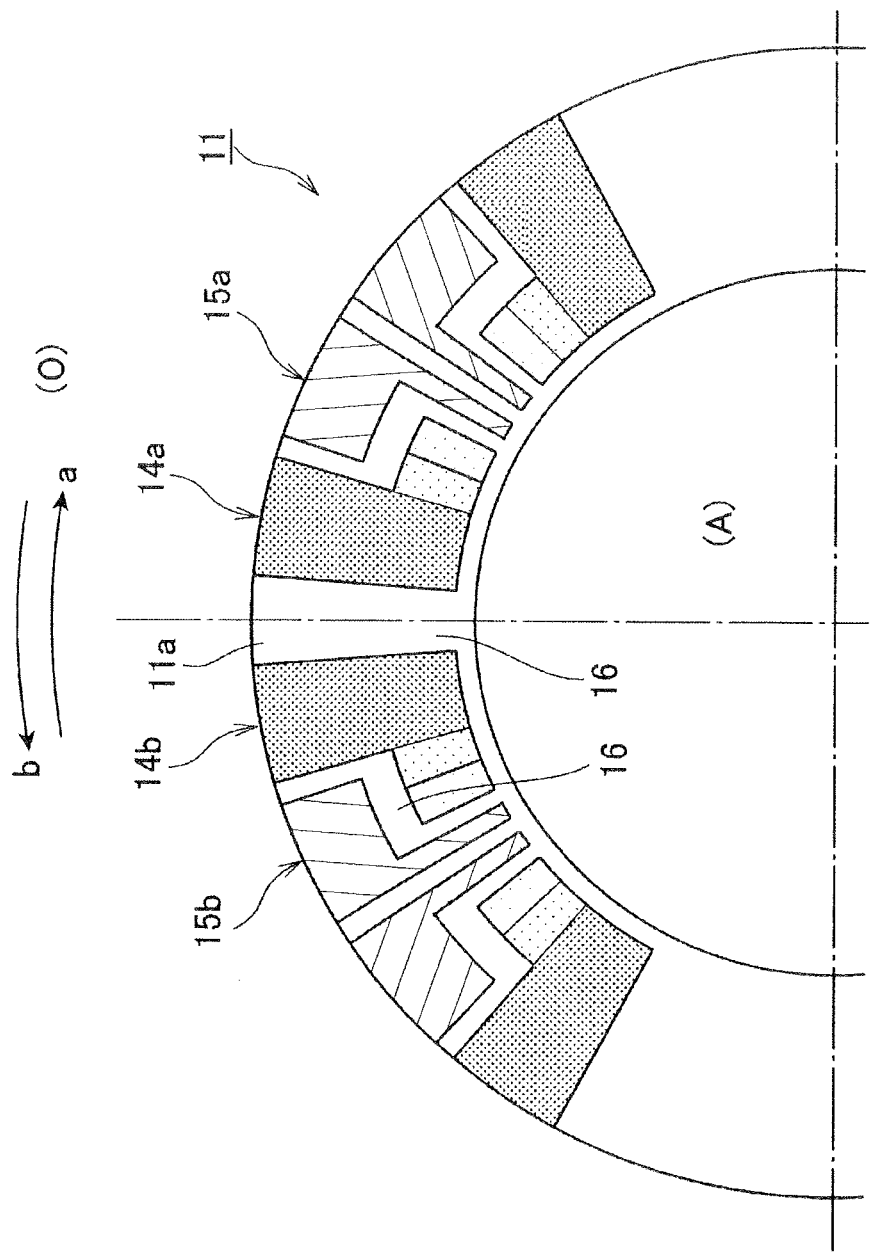
FIG. 1 is a schematic plan view showing the configuration of a sliding surface of a sliding member according to an embodiment of the present invention.
Figure 2:
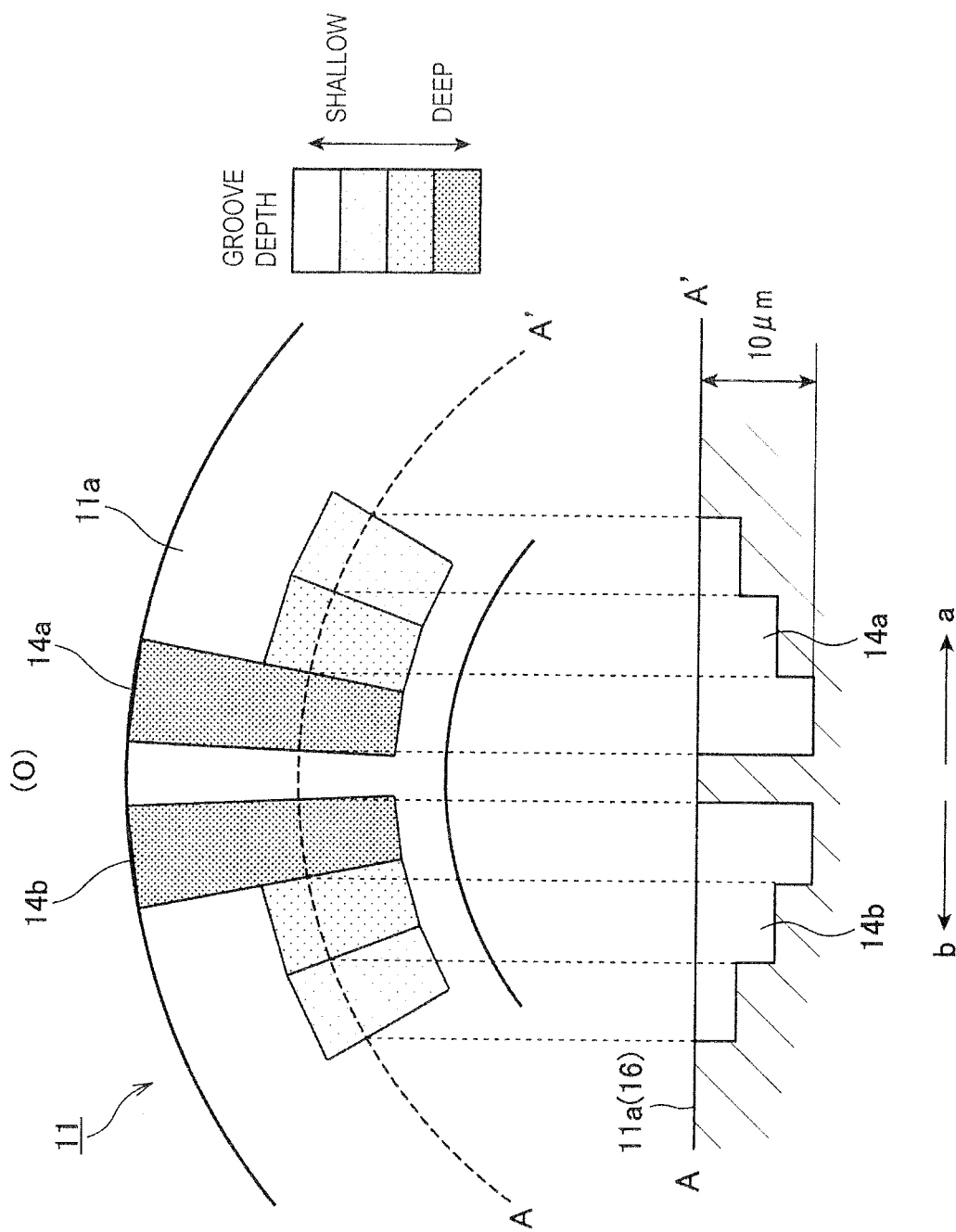
FIG. 2 is a schematic diagram showing the configuration of a dynamic pressure generating groove according to the embodiment of the present invention.
Figure 3:
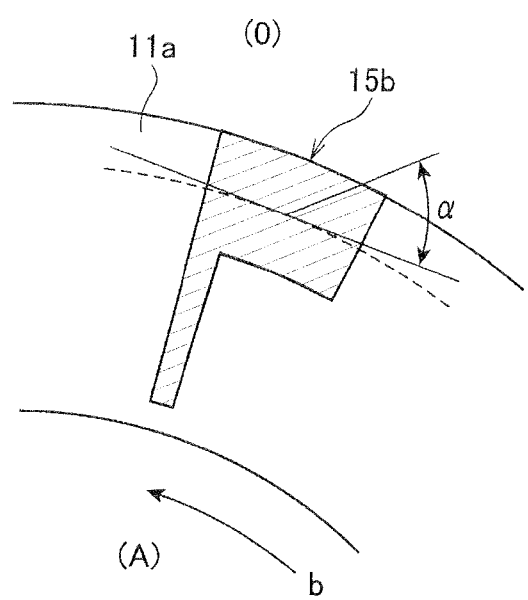
FIG. 3 is a schematic plan view showing the configuration of an concave-convex section according to the embodiment of the present invention.
Figure 4:
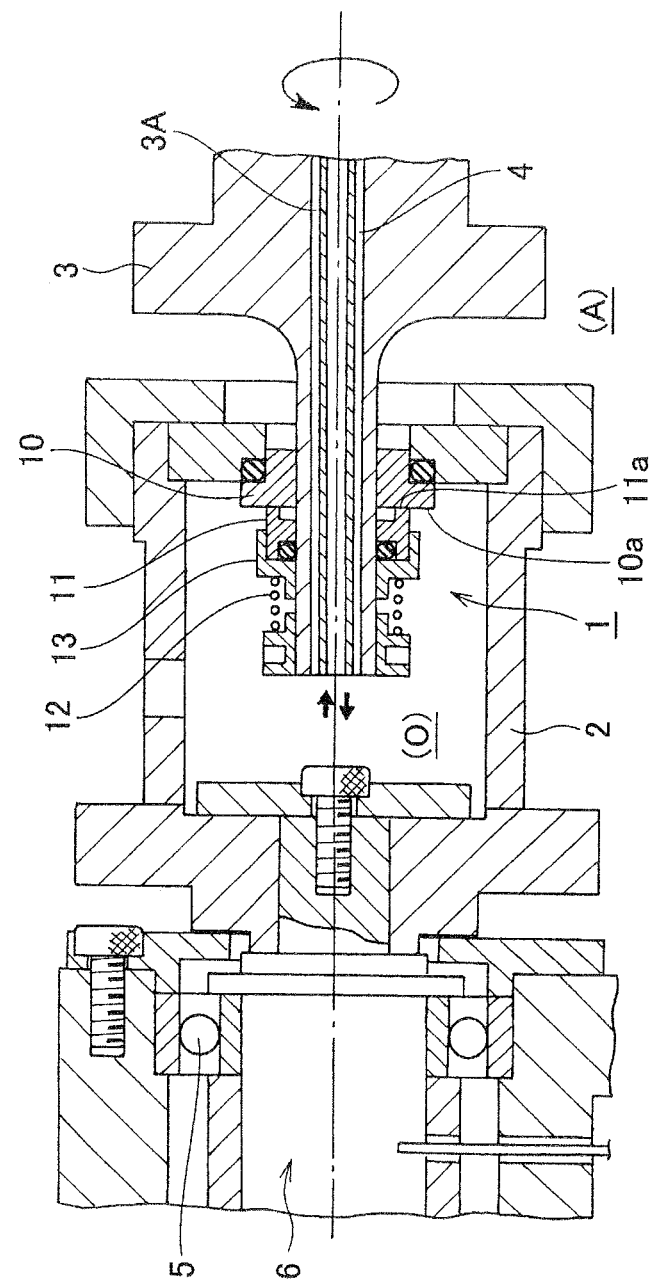
FIG. 4 is a schematic sectional view showing the configuration of a mechanical seal.
Figure 5:
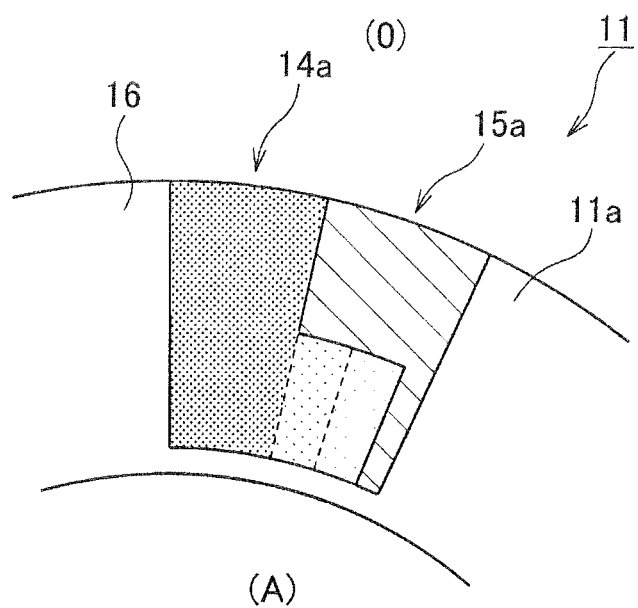
FIG. 5 is a schematic plan view showing the configuration of the sliding surface of the sliding member according to a modification.
Figure 6:
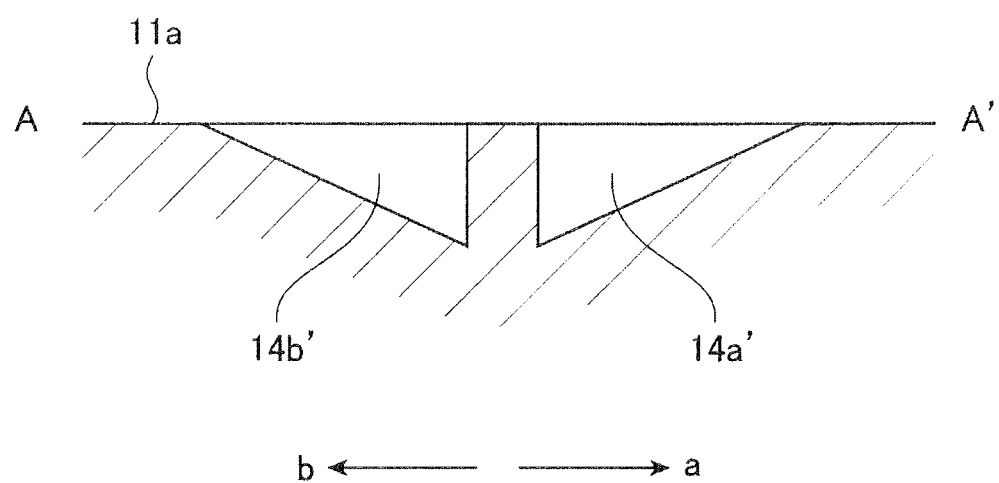
FIG. 6 is a schematic diagram showing the configuration of the dynamic pressure generating groove according to the modification.

A sliding member according to an embodiment of the present invention will be described with reference to FIGS. 1 to 4. FIG. 1 is a schematic plan view showing the configuration of a sliding surface of a sliding member according to the present embodiment. FIG. 2 is a schematic diagram showing the configuration of a dynamic pressure generating groove according to the present embodiment. FIG. 3 is a schematic plan view showing the configuration of an concave-convex section according to the present embodiment. FIG. 4 is a schematic sectional view showing the configuration of a mechanical seal. FIG. 5 is a schematic plan view showing the configuration of the sliding surface of the sliding member according to a modification. FIG. 6 is a schematic diagram showing the configuration of the dynamic pressure generating groove according to the modification.

<Configuration of Mechanical Seal>

First, a mechanical seal using a sliding member according to an embodiment of the present invention will be described with reference to FIG. 4.

A mechanical seal 1 is a sealing device that suppresses leakage of a fluid to be sealed such as oil from between a housing 2 and a rotating shaft 3 penetrating the housing 2 and is applicable to various devices such as pumps, refrigerators and the like.

The mechanical seal 1 includes a mating ring (another sliding member) 10 attached to the housing 2 and a seal ring (sliding member) 11 mounted on the rotating shaft 3. The mating ring 10 is sealed and attached to the housing 2 via an O-ring. The seal ring 11 is fixed via the O-ring to a retainer 13 elastically held on the rotating shaft 3 via an elastic member 12 such as a spring.

The mating ring 10 and the seal ring 11 are in contact with each other in an axial direction by annular end faces (sliding surfaces) 10a, 11a substantially perpendicular to the axial direction. The outer circumferential side of the mating ring 10 and the seal ring 11 faces a region to be sealed (O) where it is inside the housing 2 and the inner circumferential side thereof faces a region to not be sealed (A) where it is on the side of the atmosphere.

The mating ring 10 and the seal ring 11 are in close contact with each other in the axial direction due to an energizing force by the elastic member 12, thereby suppressing leakage of a fluid to be sealed present inside the region to be sealed (O) into the region to not be sealed (A). The annular sliding surfaces 10a, 11a of the mating ring 10 and the seal ring 11 are planished by lapping (surface polishing) or the like respectively and a sealed state of the mating ring 10 and the seal ring 11 are maintained by sliding of the sliding surfaces 10a, 11a when the rotating shaft 3 rotates.

The sliding surfaces 10a, 11a are configured to hold therebetween a fluid to be sealed or a lubricating oil when the lubricating oil is used separately from the fluid to be sealed, thereby reducing sliding resistance or abrasion. In the present embodiment, when a lubricating oil is used separately from the fluid to be sealed, the lubricating oil is assumed to be included in the fluid to be sealed.

The rotating shaft 3 is configured to be rotatable in both directions by a motor (not shown) of which rpm (revolutions per minute) thereof is controlled by an inverter. The rotating shaft 3 is also provided with a flow path 3A in the shaft center and a pipe 4 is arranged penetrating the flow path 3A.

The fluid to be sealed flows into inside of the housing 2 (region to be sealed (O)) via the pipe 4 and flows out from inside of the housing 2 via the flow path 3A. The edges (not shown) of the flow path 3A and the pipe 4 are communicatively connected to a circulation unit (not shown) and the fluid to be sealed controlled to a predetermined pressure and a predetermined temperature is allowed to circulate between the inside of the housing 2 and the circulation unit by pump connected to the pipe 4.

The housing 2 is fastened to a shaft 6 rotatably held by a bearing 5. Accordingly, the housing 2 is configured to be rotatable by sliding resistance (frictional force during rotation) between the mating ring 10 and the seal ring 11 when the rotating shaft 3 rotates.

<Configuration of Sliding Member>

The configuration of the sliding member according to the present embodiment will be described with reference to FIGS. 1 to 3.

As shown in FIG. 1, the seal ring 11 as a sliding member is an annular member and has a plurality of dynamic pressure generating grooves 14 (14a, 14b) and a plurality of concave-convex sections 15 (15a, 15b) formed of a plurality of parallel minute grooves formed on the sliding surface 11a. The seal ring 11 is anannular member made of silicon carbide (SiC) and the surface of the sliding surface 11a is planished. Arrows a, b shown in FIG. 1 show the relative flow direction of the fluid to be sealed caused between the seal ring 11 and the fluid to be sealed by the rotation of the rotating shaft 3. The flow direction is opposite to the rotation direction of the rotating shaft 3.

The dynamic pressure generating grooves 14a, 14b and the concave-convex sections 15a, 15b have respective preset directions in which an effective dynamic pressure effect or lubricity improvement effect can be produced. That is, the dynamic pressure generating groove 14a and the concave-convex section 15a are configured to be able to achieve desired dynamic pressure generation and lubricity improvement when the flow direction of the fluid to be sealed is the direction (clockwise) of the arrow a (the rotation direction of the rotating shaft 3 is the arrow b), and the dynamic pressure generating groove 14b and the concave-convex section 15b are configured to be able to achieve desired dynamic pressure generation and lubricity improvement when the flow direction of the fluid to be sealed is the direction (counterclockwise) of the arrow b (the rotation direction of the rotating shaft 3 is the arrow a), respectively.

Regarding the reference numerals of the dynamic pressure generating grooves 14a, 14b and the concave-convex sections 15a, 15b, the dynamic pressure generating groove and the concave-convex section are denoted simply as 14 and 15 respectively when there is no need to describe them by distinguishing directional properties.

Also as shown in FIG. 1, the dynamic pressure generating groove 14 and the concave-convex section 15 of which directional properties match are arranged adjacent to each other and each form a pair. In each pair, the concave-convex section 15 is arranged downstream of the dynamic pressure generating groove 14 in the effective flow direction. Such a pair of the dynamic pressure generating groove 14 and the concave-convex section 15 is arranged equally along the entire circumference of the sliding surface 11a in such a way that pairs having different directional properties are adjacent to each other.

Also as shown in FIG. 1, the dynamic pressure generating groove 14 and the concave-convex section 15 are provided by being spaced to the adjacent dynamic pressure generating groove 14 and the adjacent concave-convex section 15, respectively and a land portion 16 is formed therebetween.

The land portion 16 does not have to be formed between the dynamic pressure generating groove 14 and the concave-convex section 15 having matched directional properties and each forming a pair (that is, between the dynamic pressure generating groove 14a and the concave-convex section 15a and between the dynamic pressure generating groove 14b and the concave-convex section 15b) like in a modification shown in FIG. 5. With the above configuration, a region where minute grooves constituting the concave-convex section 15a are open to the side of the region to be sealed (O) can be increased. Thus, the introduction of the fluid to be sealed to the sliding surface 11a is promoted so that the lubricity improvement effect can be enhanced.

<<Configuration of Dynamic Pressure Generating Groove>>

The configuration of the dynamic pressure generating groove 14 will be described with reference to FIG. 2. In FIG. 2, the upper part is a plan view of dynamic pressure generating groove and the lower part is an AA' sectional view of the plan view.

As shown in the upper part of FIG. 2, the dynamic pressure generating groove 14 is a substantially hook-shaped (L-shaped) groove extending from the outer circumferential edge of the sliding surface 11a toward the inner circumferential side in a substantially radial direction and bending the tip thereof substantially in a circumferential direction. The dynamic pressure generating groove 14 is configured to be open to the region to be sealed (O) on the outer circumference of the seal ring 11 so that the fluid to be sealed present in the region to be sealed (O) is more likely to be drawn into the groove.

As shown in the lower part of FIG. 2, the depth of the dynamic pressure generating groove 14 (distance from the sliding surface 11a in the axial direction) gradually changes along the sliding direction (circumferential direction of the sliding surface 11a) in a portion extending in the circumferential direction. More specifically, the depth of the dynamic pressure generating groove 14 is configured to gradually become shallower along respective effective flow directions. That is, the dynamic pressure generating groove 14a gradually becomes shallower along the arrow a direction and the dynamic pressure generating groove 14b gradually becomes shallower along the arrow b direction.

The space between the dynamic pressure generating groove 14 and the sliding surface 10a of the mating ring 10 opposite to the dynamic pressure generating groove 14 gradually becomes narrower while moving along the path of the fluid to be sealed drawn into the groove from the region to be sealed (O). With the fluid to be sealed moving through the space that gradually becomes narrower, dynamic pressure acting to separate the mating ring 10 and the seal ring 11 from each other (that is, resisting an energizing force of the elastic member 12) is generated. Accordingly, a lubricating film formed by the fluid to be sealed is more likely to be formed between the sliding surfaces 10a, 11a, improving sliding properties.

The dynamic pressure generating groove 14 can be formed by performing micro-machining on the planished sliding surface 11a by a YVO4 laser or sand blasting. Depending on the product size, the dynamic pressure generating groove 14 may be formed by cutting. In the seal ring 11 according to the present embodiment, the dynamic pressure generating groove 14 is formed so that the depth in a maximum depth portion is about 10 μm.

Instead of changing the depth of the dynamic pressure generating groove 14 stepwisely as shown in FIG. 2, like the modification shown in FIG. 6, the groove bottom may be constituted of an inclined surface with respect to the sliding surface 11a so that the depth of groove changes linearly. Alternatively, a plurality of inclined surfaces of different angles may be combined or the depth of groove may be changed curvilinearly by configuring the groove bottom by a curve.

<<Configuration of Concave-Convex Section>>

The configuration of the concave-convex section 15 will be described with reference to FIG. 3.

As shown in FIG. 3, the concave-convex section 15 is formed in a region downstream of the dynamic pressure generating groove 14 in an effective flow direction and the outer circumferential side thereof reaches the outer circumferential edge and the inner circumferential side thereof spreads just before the inner circumferential edge. The concave-convex section 15 has a periodic structure formed of a plurality of minute grooves extending in parallel with fixed pitches.

The concave-convex section 15 in the present embodiment has a configuration in which minute grooves of which depth is about 0.18 μm are formed with pitches of about 0.75 μm and is a very fine structure compared with the dynamic pressure generating groove 14.

As shown in FIG. 3, the minute groove extends in a direction forming an angle α with respect to the tangent to an arc locus along the sliding direction indicated by a broken line in the figure. The direction in which the minute groove extends is a direction in which a flow from the side of the region to be sealed (O) toward the region to not be sealed (A) is gradually formed as the fluid to be sealed streams.

That is, in the example of the concave-convex section 15b shown in FIG. 3, the minute groove extends so that the fluid to be sealed flowing in the b direction is gradually guided from the outer circumferential side of the seal ring 11 toward the inner circumferential side thereof. In the present embodiment, the minute groove in each of the concave-convex sections 15a, 15b is inclined at an angle of ±45° with respect to the sliding direction.

By forming the concave-convex section 15 as described above, the fluid to be sealed is more likely to be drawn to between the sliding surfaces 10a, 11a, improving lubricity between the sliding surfaces 10a, 11a.

In the present embodiment, the concave-convex section 15 is formed by using a femtosecond laser. That is, the machining method uses a phenomenon in which when a substrate is irradiated with a linearly polarized laser with irradiation intensity near a processing threshold, a grating-like periodic structure having the pitch and groove depth on the order of the wavelength is self-organizingly formed in a direction perpendicular to the polarization direction by interference between incident light and scattered light or plasma light along the surface of the substrate. As disclosed in Patent Document 1, the processing method using a femtosecond laser is a publicly known processing method and a detailed description thereof will not be repeated.

Processing conditions of the femtosecond laser according to the present embodiment include the use of a titanium sapphire laser as the laser, the pulse width of 120 fs, the center wavelength of 800 cm, and the pulse repetition frequency of 1 kHz. Under such processing conditions, the above periodic structure in which the angle α is ±45°, the pitch is about 0.75 μm, and the depth is about 0.18 μm is formed.

The processing method of the concave-convex section 15 is not limited to the processing method by the femtosecond laser. Another method may be adopted when appropriate if the method can improve lubricity of the mechanical seal and form irregularities (grooves) of the depth on the order of submicrometer, which is advantageous for reduction of leakage.

Advantages of the Present Embodiment

According to the present embodiment, sliding properties at low speed can be improved. The concave-convex section 15 constituted of minute grooves shallower than the dynamic pressure generating groove 14 can produce an effect of reducing the coefficient of friction even when the rotational speed of the rotating shaft 3 is low. Therefore, lubricity of the sliding surface 11a can be increased by the concave-convex section 15 before the rotational speed of the rotating shaft 3 reaches the speed at which a dynamic pressure effect by the dynamic pressure generating groove 14 is obtained. Moreover, if the rotational speed of the rotating shaft 3 increases to generate a dynamic pressure effect by the dynamic pressure generating groove 14, excellent lubricity can be maintained also at high speed.

Also according to the present embodiment, lubricity by the concave-convex section 15 can be improved by forming the concave-convex section 15 downstream of the dynamic pressure generating groove 14 in the flow direction of the fluid to be sealed and close to the dynamic pressure generating groove 14. That is, by forming the dynamic pressure generating groove 14 deeper than the minute grooves constituting the concave-convex section 15 in the upstream side of the concave-convex section 15 in the flow direction of the fluid to be sealed, the amount of the fluid to be sealed guided into the concave-convex section 15 can be increased.

Normally, the fluid to be sealed flows from a region close to the region to be sealed (O) in the concave-convex section 15, that is, a region on the outer circumferential side of the seal ring 11 on the sliding surface 11a into the concave-convex section 15. According to the present embodiment, in addition to the region close to the outer circumference of the seal ring 11, the inflow of the fluid to be sealed can be sought also from a region close to the dynamic pressure generating groove 14.

The inflow region of the fluid to be sealed into the concave-convex section 15 can be enlarged by, as described above, providing a region close to the dynamic pressure generating groove 14 and thus, even if the range of the region close to the outer circumference of the seal ring 11 is reduced, a desired amount of inflow can be secured. Therefore, the range of formation of the concave-convex section 15 in the circumferential direction can be decreased so that flexibility of design can be increased. Particularly when a plurality of the dynamic pressure generating grooves 14 or a plurality of the concave-convex sections 15 is formed, the number of the dynamic pressure generating grooves 14 or the concave-convex sections 15 that can be formed is advantageously increased.

If, as shown in FIG. 5, the dynamic pressure generating groove 14 and the concave-convex section 15 are provided adjacent to each other, it becomes easier for the fluid to be sealed to flow into the concave-convex section 15 so that lubricity at low speed can further be improved. That is, the fluid to be sealed is introduced into the concave-convex section 15 from the dynamic pressure generating groove 14 immediately after the start of rotation and therefore, lifting force acting to separate the sliding surface 11a from the sliding surface 10a of the mating ring 10 can be caused at the onset of the start of rotation.

If the rotation direction of the rotating shaft 3 changes and the flow direction of the fluid to be sealed is reversed, the dynamic pressure generating groove 14 and the concave-convex section 15 produce opposite effects. That is, the dynamic pressure generating groove 14 does not generate dynamic pressure and acts to guide the fluid to be sealed from the side of the region to not be sealed (A) of the sliding surface 11a to the region to be sealed (O). Also with the changed rotation direction of the rotating shaft 3, the inclination direction of a plurality of minute grooves constituting the concave-convex section 15 acts in a direction that guides the fluid to be sealed from the side of the region to not be sealed (A) of the sliding surface 11a to the side of the region to be sealed (O).

The present embodiment includes the dynamic pressure generating groove 14a and the concave-convex section 15a (a first dynamic pressure generating groove and a first concave-convex section), each generating dynamic pressure when the rotation direction of the rotating shaft 3 is the arrow b, and the dynamic pressure generating groove 14b and the concave-convex section 15b (a second dynamic pressure generating groove and a second concave-convex section), each generating dynamic pressure when the rotation direction of the rotating shaft 3 is the arrow a. Accordingly, leakage of the fluid to be sealed into the region to not be sealed (A) due to excessive introduction thereof to the sliding surface 11a can be suppressed while active introduction of the fluid to be sealed to the sliding surface 11a being sought regardless of the rotation direction of the rotating shaft 3.

Further, the present embodiment has a configuration in which the first dynamic pressure generating groove, the first concave-convex section, the second concave-convex section, and the second dynamic pressure generating groove are arranged in this order from upstream to downstream in the flow direction of the fluid to be sealed for one rotation direction of the rotating shaft 3. That is, if the rotation direction of the rotating shaft 3 is the arrow b (the flow direction of the fluid to be sealed is the arrow a), the dynamic pressure generating groove 14a, the concave-convex section 15a, the concave-convex section 15b, and the dynamic pressure generating groove 14b are arranged in this order and if the rotation direction of the rotating shaft 3 is the arrow a (the flow direction of the fluid to be sealed is the arrow b), the dynamic pressure generating groove 14b, the concave-convex section 15b, the concave-convex section 15a, and the dynamic pressure generating groove 14a are arranged in this order.

According to the above configuration, a flow of suction into the sliding surface 11a and a flow of discharge from the sliding surface 11a are formed in the fluid to be sealed along the flow direction thereof. Particularly in the formation of a flow of discharge, it is made easier to discharge the fluid to be sealed by arranging the dynamic pressure generating groove 14 with a deep groove next to the concave-convex section 15 with a shallow groove (in the range of speed in which the rotating shaft 3 is at low speed and the concave-convex section 15 generates pressure, the dynamic pressure generating groove 14 functions as a groove for discharge). Accordingly, lubricity can be improved while leakage of the fluid to be sealed to the region to not be sealed (A) being suppressed more effectively.

<Others>

In the above embodiment, the seal ring 11 is used as a sliding member in the present invention and the mating ring 10 is used as another sliding member in the present invention, but the mating ring 10 may be applied as a sliding member in the present invention and the seal ring 11 may be applied as another sliding member in the present invention. That is, a configuration in which the dynamic pressure generating groove 14 and the concave-convex section 15 are formed on the sliding surface 10a of the mating ring 10 may be adopted.

In the above embodiment, as shown in FIG. 4, the sliding surface 11a of the seal ring 11 is formed smaller than the sliding surface 10a of the mating ring 10 and the entire surface of the sliding surface 11a is configured to be in contact with the sliding surface 10a. If the sliding member according to the present invention is applied as the mating ring 10, the dynamic pressure generating groove 14 and the concave-convex section 15 may be formed as described within a contact region of the sliding surface 10a with the sliding surface 11a. In this case, the dynamic pressure generating groove 14 and the concave-convex section 15 need not extend to the outer circumferential edge of the sliding surface 10a and need only to extend to a position to be open to the region to be sealed (O) beyond the contact region with the sliding surface 11a.

DESCRIPTION OF REFERENCE NUMERALS

1 Mechanical seal
10 Mating ring
11 Seal ring
12 Elastic member
13 Retainer
14 Dynamic pressure generating groove
15 Concave-convex section
16 Land portion 2 Housing
3 Rotating shaft
4 Pipe
5 Bearing
6 Shaft

The invention claimed is:

1. A mechanical seal device for suppressing leakage of a fluid to be sealed from between a housing and a rotating shaft penetrating the housing, the mechanical seal device comprising:
a housing;
a rotating shaft penetrating the housing;
a fluid to be sealed located between the housing and the rotating shaft;
a first sliding member having an annular shape and being mounted on one of the housing and the rotating shaft; and
a second sliding member having annular shape and being mounted on the other of the housing and the rotating shaft that the first sliding member is not mounted on;
wherein the first sliding member has a sliding surface that freely slidingly comes into contact with a sliding surface of the second sliding member after receiving an energizing force in an axial direction;
wherein on the sliding surface of the first sliding member there is a dynamic pressure generating groove that guides the fluid to be sealed from a side of a region to be sealed to a side of a region to not be sealed of the first sliding member sliding surface;
wherein the dynamic pressure generating groove also generates dynamic pressure resisting the energizing force by relative flow of the fluid to be sealed caused by rotation of the rotating shaft;
wherein on the sliding surface of the first sliding member there is a concave-convex section that is a separate groove arranged directly adjacent and spaced apart from the dynamic pressure generating groove such that deepest points in the concave-convex section groove are shallower than any deep point in the dynamic pressure generating groove, with the concave-convex section constituted of a plurality of minute grooves extending in a direction inclined with respect to a sliding direction of the first sliding member such that the fluid to be sealed is guided from the side of the region to be sealed to the side of the region to not be sealed of the first sliding member sliding surface; and
wherein the dynamic pressure generating groove and the concave-convex section each have an L-shaped groove shape in a plan view, wherein the dynamic pressure generating groove and the concave-convex section L-shaped groove shapes are radially reversed and arranged as a fitted oriented pair having matched directional properties therebetween.

2. The mechanical seal device according to claim 1, wherein the dynamic pressure generating groove and the concave-convex section are formed close to each other.

3. The mechanical seal device according to claim 2, wherein the concave-convex section is formed downstream of the dynamic pressure generating groove in a flow direction of the fluid to be sealed.

4. The mechanical seal device according to claim 1, wherein
the dynamic pressure generating groove is a first dynamic pressure generating groove that generates the dynamic pressure for one rotation direction of the rotating shaft; and
the concave-convex section is a first concave-convex section that guides the fluid to be sealed from the side of the region to be sealed of the first sliding member sliding surface to the side of the region to not be sealed thereof for the one rotation direction of the rotating shaft; and
the sliding surface of the first sliding member further comprises:
a second dynamic pressure generating groove that generates the dynamic pressure for another rotation direction of the rotating shaft; and
a second concave-convex section that guides the fluid to be sealed from the side of the region to be sealed of the first sliding member sliding surface to the side of the region to not be sealed thereof for the another rotation direction of the rotating shaft.

5. The mechanical seal device according to claim 4, wherein the first dynamic pressure generating groove, the first concave-convex section, the second concave-convex section, and the second dynamic pressure generating groove are arranged in this order from upstream to downstream in the flow direction of the fluid to be sealed for the one rotation direction of the rotating shaft.

6. The mechanical seal device according to claim 2, wherein
the dynamic pressure generating groove is a first dynamic pressure generating groove that generates the dynamic pressure for one rotation direction of the rotating shaft; and
the concave-convex section is a first concave-convex section that guides the fluid to be sealed from the side of the region to be sealed of the first sliding member sliding surface to the side of the region to not be sealed thereof for the one rotation direction of the rotating shaft; and
the sliding surface of the first sliding member further comprises:
a second dynamic pressure generating groove that generates the dynamic pressure for another rotation direction of the rotating shaft; and
a second concave-convex section that guides the fluid to be sealed from the side of the region to be sealed of the first sliding member sliding surface to the side of the region to not be sealed thereof for the another rotation direction of the rotating shaft.

7. The mechanical seal device according to claim 3, wherein
the dynamic pressure generating groove is a first dynamic pressure generating groove that generates the dynamic pressure for one rotation direction of the rotating shaft; and
the concave-convex section is a first concave-convex section that guides the fluid to be sealed from the side of the region to be sealed of the first sliding member sliding surface to the side of the region to not be sealed thereof for the one rotation direction of the rotating shaft; and
the sliding surface of the first sliding member further comprises:
a second dynamic pressure generating groove that generates the dynamic pressure for another rotation direction of the rotating shaft; and
a second concave-convex section that guides the fluid to be sealed from the side of the region to be sealed of the first sliding member sliding surface to the side of the region to not be sealed thereof for the another rotation direction of the rotating shaft.

\* \* \* \* \*